No. 856,520. PATENTED JUNE 11, 1907.
E. DÖNITZ.
GUN SIGHT TELESCOPE.
APPLICATION FILED DEC. 14, 1904.
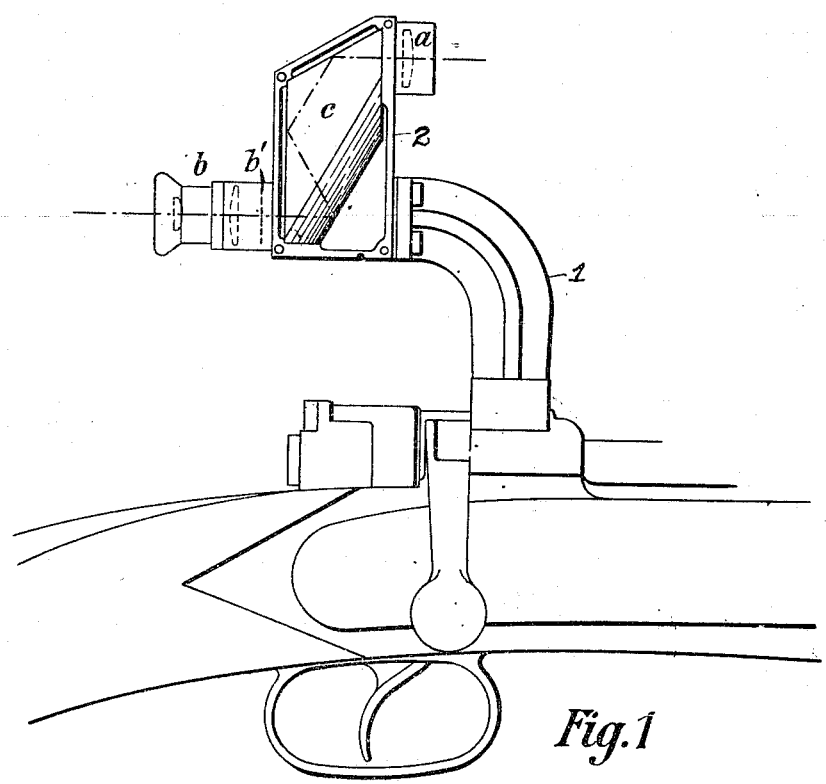
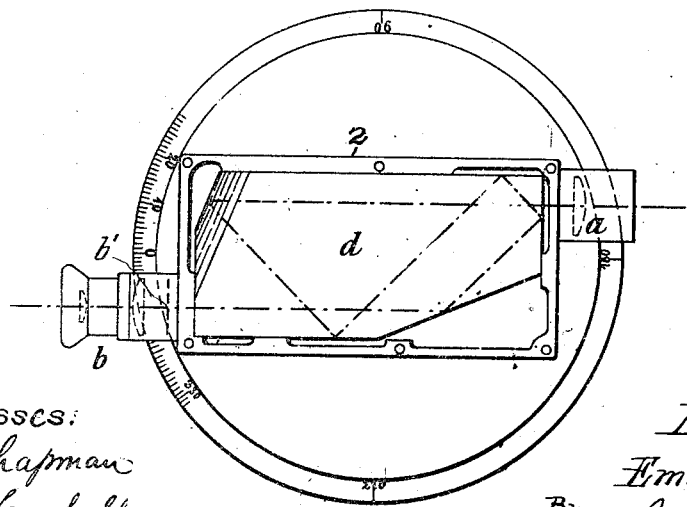
Fig.1
Fig.2
Witnesses:
F. T. Chapman
C. E. Marshall
Inventor:
Emil Dönitz,
By Lyons & Bissing,
Attorneys.

UNITED STATES PATENT OFFICE.

EMIL DÖNITZ, OF JENA, GERMANY, ASSIGNOR TO THE FIRM OF CARL ZEISS, OF JENA, GERMANY.

GUN-SIGHT TELESCOPE.

No. 856,520.  Specification of Letters Patent.  Patented June 11, 1907.

Application filed December 14, 1904. Serial No. 236,836.

*To all whom it may concern:*

Be it known that I, EMIL DÖNITZ, a citizen of the German Empire, and a resident of Jena, Germany, have invented a new and useful Improvement in Gun-Sight Telescopes, of which the following is a specification.

Telescopes in which the reversed image produced by the objective is erected by a system of prisms instead of by a system of lenses are manifestly, because of their large fields of view, peculiarly appropriate for the sights of guns, whether such be small arms or ordnance. But such gun sight telescopes as heretofore constructed have proved objectionable because the optical axis, that is the line of sight at zero deflection, does not remain invariable. This has been true because the various prismatic systems which have heretofore been used in gun sight telescopes consist each of at least two prisms separated from each other either by an air space or by cement. Since it is well known, in this art, that there is no known cement which fulfils the optical requirements and at the same time hardens completely, it has been necessary in all cases to firmly secure each of the prisms of a system separately in the prism casing. In this way each of the separate prisms is liable to an accidental rotary displacement, within the prism casing, of substantially the same amount, and when both prisms are displaced the accidental deflections of the line of sight produced thereby may reinforce each other. Many attempts have therefore been made to more firmly secure the separate prisms of gun-sight telescopes within their casings in an immovable manner, a problem which has been rendered difficult by the change in their refractive condition which is brought about by any deformation caused by undue pressure upon the prisms. No satisfactory solution of this problem has as yet been found.

Now I have produced a gun-sight telescope which avoids these objections by using therein a single-piece image-erecting prism. I may say that while such single-piece image-erecting prisms are known in the art, they have not as yet found a practical application therein; and it must be distinctly understood that they cannot be built by adopting the arrangement of reflecting surfaces obtained by the juxtaposition of the parts of a multi-prism system. On the contrary they have an arrangement of reflecting surfaces peculiarly their own, the optical reason for which it is unnecessary here to recite.

By an examination of the question from an optical and not as it might be imagined from a geometrical standpoint, mere geometrical considerations having no application to the problem in hand, I have discovered that the size of a single-piece image-erecting prism necessarily exceeds that of each component of the multi-piece image-erecting prism systems. It follows therefrom that by the use of such single-piece prism in gun-sight telescopes, where the danger from displacement due to shocks is peculiarly great, I attain the following advantages: The accidental angular deflection of the line of sight, due to shocks and consequent displacement of the prism in its frame, is but a fraction of that due to any of the parts of a multi-piece prism. The same remark also applies to the maximum angular accidental deflection. Finally the probability of any accidental deflection is but half of that existing in the case of a two-piece prism.

In the drawings,—Figure 1 is an elevation of a sight embodying my invention applied to a rifle, the cover being removed from the prism case. Fig. 2 is a plan view of a sight, embodying my invention, applied to a piece of ordnance, the cover of the prism case being removed.

In Fig. 1, I have shown a frame carrying my sighting telescopes which is adapted for attachment to the rifle. This frame comprises a curved arm 1 to which is firmly secured the prism case 2 carrying the objective $a$ and the astronomical eye-piece $b$ fitted with a reticule $b'$. Since the single-piece image-erecting prism $c$ may be securely lodged within the prism case, it will be seen that the frame rigidly supports the prism. The path of a ray of light is shown by a broken line passing through the objective, the prism and the eye-piece and this makes sufficiently plain, for those skilled in the art, the character of the prism.

In Fig. 2 the prism case 2, carrying the objective $a$, the astronomical eye-piece $b$, and containing the single-piece image-erecting prism $d$, is mounted on a dial base by which arrangement the parts may be secured in a rotatable manner to the head of an ordnance sighting attachment.

In each figure, the prisms are shown with a so-called roof, that is to say a combination of two reflecting surfaces, as will be readily understood from other re-erecting prismatic systems.

I claim,

1. The combination of a gun and a sighting telescope comprising an objective, a single-piece image-erecting prism and an astronomical eye-piece all of which lie in the path of the rays from the target to the eye, substantially as described.

2. The combination of a gun and a frame rigidly secured to the gun; and an objective, a single-piece image-erecting prism and an astronomical eye-piece rigidly supported in the frame through which the light rays from the target pass in the order named, substantially as described.

3. The combination of a gun and a frame inclosing and rigidly supporting a single-piece image-erecting prism, an objective, an astronomical eye-piece, and a reticule, all of which lie in the path of the rays from the target to the eye, substantially as described.

In testimony whereof I have signed my name to this specification in the presence of two subscribing witnesses.

EMIL DÖNITZ.

Witnesses:
PAUL KRÜGER,
FRITZ SANDER.